May 4, 1926.
H. W. WAGNER
LAWN MOWER
Filed July 30, 1923
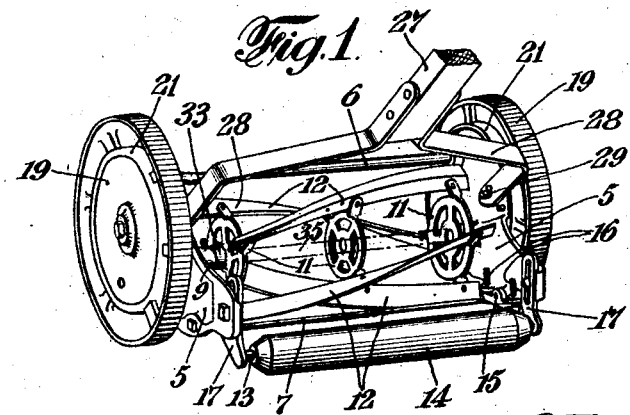
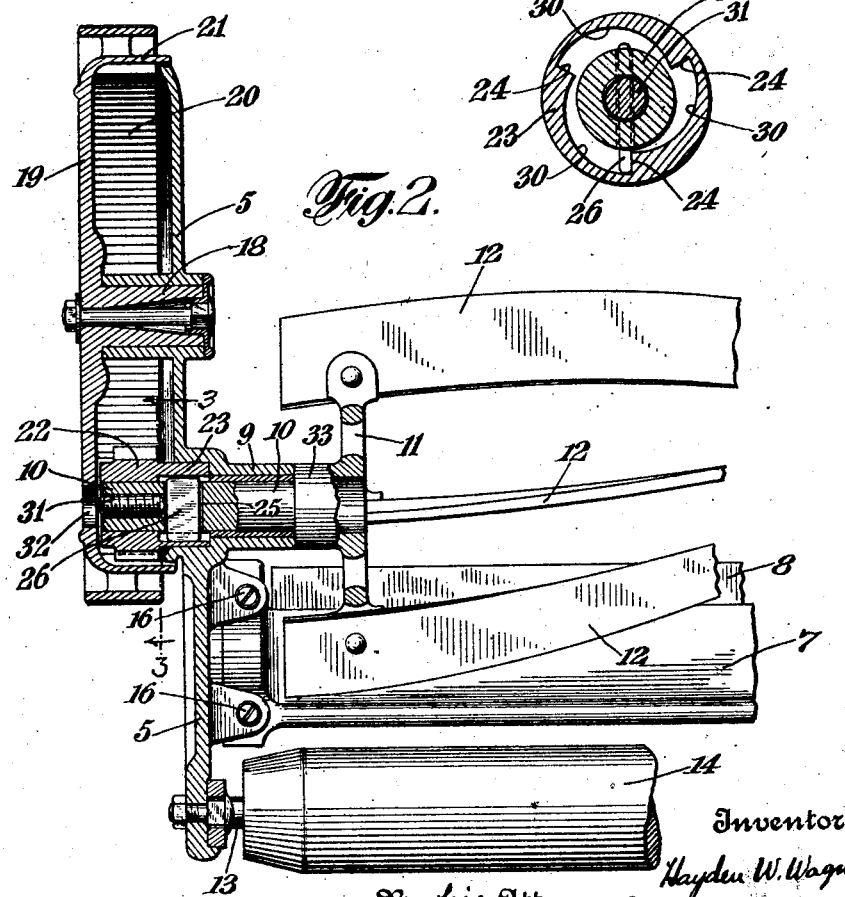

Patented May 4, 1926.

1,583,103

UNITED STATES PATENT OFFICE.

HAYDEN W. WAGNER, OF NEWBURGH, NEW YORK, ASSIGNOR TO COLDWELL LAWN MOWER COMPANY, OF NEWBURGH, NEW YORK, A CORPORATION OF NEW YORK.

LAWN MOWER.

Application filed July 30, 1923. Serial No. 654,513.

*To all whom it may concern:*

Be it known that I, HAYDEN W. WAGNER, a citizen of the United States, and resident of Newburgh, county of Orange, and State of New York, have invented certain new and useful Improvements in Lawn Mowers, of which the following is a specification.

My invention relates to improvements in mowers and while it may be utilized in many kinds of mowers, it is particularly adapted for use in lawn mowers.

In the ordinary form of lawn mower provided with a fixed knife and a rotary cutter cooperating therewith, the traction wheels through a pawl and ratchet arrangement are adapted to drive the cutter in one direction to cut the grass when the mower is propelled forwardly, but because of the pawl and ratchet arrangement, the rotary cutter is permitted to remain relatively stationary when the mower is propelled backwardly or the traction wheels are reversely rotated. In such a mower the knives of rotary cutter gradually become dull in use and they are ordinarily sharpened by hand filing or by removing the cutter and sharpening the knives on any suitable machine. If, however, a suitable sharpening composition such as emery dust and oil be placed upon the fixed knife and the fixed knife be more closely adjusted to the knives of the rotary cutter and the rotary cutter be rotated in a reverse direction, the knives thereof may be effectively sharpened. The main object of my invention is to provide an arrangement whereby this sharpening operation may be thus accomplished by a reverse rotation of the cutter in cooperation with the fixed knife by rotating the traction wheels reversely as for example by propelling the mower backwardly.

Further and more specific objects, features and advantages will more clearly appear from the detail description given below taken in connection with the accompanying sheet of drawings, which forms a part of this specification.

Referring to the drawings Fig. 1 is a perspective view of a lawn mower embodying my improvements in a preferred form. Fig. 2 is a section through one side thereof and Fig. 3 is a detail section taken on the line 3—3 of Fig. 2.

Referring to the drawing, the mower is shown as having two side frames 5, 5 held in suitably spaced relation by tie rod 6 and fixed knife support 7 carrying relatively fixed knife 8 which is secured to the support 7 in any suitable manner. The frames 5 are provided with suitable bearings 9 in which are journaled axles 10 in the present instance shown as integral with the hubs 33, the hubs 33 being integral with the rotary cutter frame members 11 which carry the rotary cutter knives 12. The side members 5 have adjustably secured thereto brackets 17 which carry the cross rod 13 on which is journaled the guide ground roller 14. The knife support 7 is pivotally mounted on side frames 5 as shown at 15 and at each end is provided with suitable lugs adapted to be engaged by set screws 16 which pass through lugs on the side frames whereby by adjusting these set screws the fixed knife 8 may be adjusted toward or away from the rotating cutter knives. Journaled in the side frames 5 at 18 are the traction gear wheels 19. These traction wheels are provided with traction teeth on the outside periphery thereof, and with internal gear teeth 20 on the inside of flange 21 thereof. The axles 10 of the rotary cutter project through the side frames 5 and into the gear teeth 20 and have journaled on the outer ends thereof gear wheels 22, the teeth of which mesh with the internal gear teeth 20 so that upon rotation of the driving gear wheels 19 in either direction the small gear wheels 22 will be correspondingly rotated. Each gear wheel 22 is provided with a hub 23 which is provided with internal ratchet teeth 24 (see Fig. 3). The axles 10 are slotted in the plane of these ratchet teeth as shown at 25 and in these slots are sliding pawls 26.

The mower is provided with a suitable handle member 27 pivotally secured by arms 28 to the side frame members 5 at 29.

When the mower is propelled forwardly the traction wheels 19 are rotated due to their traction on the ground whereby the internal gear teeth 20 rotate the small gear 22, which through the ratchet teeth 24 integral therewith engaging the pawl 26 as shown in Fig. 3, cause the axles 10 and rotary cutter to be rotated in a direction to cut the grass in the usual manner. In such case the parts will rotate in a clockwise direction as viewed in Fig. 3. If the mower be propelled backwardly and the driving wheels 19 rotate in a reverse direction so that the small gear wheels 22 are rotated in a reverse direction, then the ratchet members 23 will rotate in the opposite direction and in a counter-clockwise direction as viewed in Fig. 3 so that the pawl members 26 will simply ride over the cam faces 30 without rotating the axles 10 and so permit the rotary cutter to remain relatively stationary when the mower is propelled backwardly or when the driving wheels 19 are rotated backwardly.

I have, however, provided means whereby, when the mower is propelled backwardly or the driving wheels 19 are rotated reversely, the rotary cutter may be caused to rotate reversely so as to perform the sharpening operation above pointed out. In the particular form shown this consists of a set screw 31, screw-threaded into the end of one or both of the axles 10 as shown in Fig. 2 and adapted at its inner end to abut firmly against the sliding pawl 26. At its outer end the set screw 31 is provided with a suitable slot for engagement with a screw driver and the wheel 19 is provided with a suitable opening at 32 through which a screw driver may be inserted to engage the set screw 31. When it is desired to carry out the sharpening operation as above pointed out, the fixed knife 8 is adjusted as closely as practicable to the rotating cutter knives, a suitable amount of emery dust and oil or other suitable composition is applied to the knives or the fixed knife 8, the set screw 31 is screwed in until it firmly abuts and locks the pawl 26 so that it is no longer slidable through the slot 25 in the axle 10 and is in fixed relation thereto. Then the mower is propelled backwardly or the wheels 19 reversely rotated whereupon the small gears 22 are reversely rotated and the pawl 26 will no longer slide over the cam faces 30 but will bind thereagainst and become fixed relative to the ratchet 23 so that the latter will drive the pawl 26 and axle 10 in a reverse direction and so reversely rotate the rotating cutter and satisfactorily carry out the sharpening operation.

If desired the axles 10 instead of comprising two members on the hubs 33, one at each end of the rotary cutter, may comprise a single bar secured to and extending centrally and axially through the rotary cutter as shown in dotted lines at 35 in Fig. 1.

While I have described my improvements in great detail and with respect to a preferred embodiment of the invention, I do not desire to be limited to such details or forms since many changes and modifications may be made and the invention embodied in widely different forms without departing from the spirit and scope thereof in its broader aspects.

What I claim as new and desire to secure by Letters Patent, is:

1. A lawn mower having a fixed knife and a rotatable cutter, a ground wheel with internal teeth formed thereon, a spur gear in mesh with said internal gear teeth and provided with internal ratchet teeth and carried by a spindle rigid with said cutter, a pawl mounted to slide through said spindle in a transverse direction and to engage said internal ratchet teeth positively to drive said cutter in one direction and slide back and forth in said spindle to ride over said ratchet teeth in the other direction, and a member screwed into the end of said spindle and adapted to abut said pawl to lock it with respect to said spindle whereby it will engage said ratchet teeth to drive said spindle and cutter in the reverse direction.

2. A mower having in combination a fixed knife, a rotatable cutter, a ground wheel, internal gear teeth on said ground wheel, a spur gear in mesh with said internal gear teeth, internal ratchet teeth rigid with said spur gear, a pawl slidable transversely of said spur gear axis and positively engaging said teeth to drive the cutter in one direction and riding over the teeth in the other direction of rotation of the ground wheel, and a threaded member engaging said pawl and locking the same with respect to the cutter whereby it will engage said teeth to drive said cutter in the reverse direction.

3. A lawn mower having a fixed knife and a rotatable cutter, a ground wheel with internal teeth formed thereon, a spur gear in mesh with said internal gear teeth and carried by a spindle rigid with said cutter, a pawl mounted to slide in said spindle transversely of the same, said spur gear having internal projections adapted to be engaged by the ends of said pawl whereby the ground wheel will drive the cutter when rotated in one direction and when rotated in the reverse direction said cutter will remain stationary, and a member screw threaded axially in the end of said spindle and adapted to lock said pawl whereby said pawl will engage said teeth to drive said cutter in the reverse direction.

In testimony whereof I have signed my name to this specification.

HAYDEN W. WAGNER.